(No Model.)

J. GOLDSTEIN.
SALT FEEDING DEVICE.

No. 281,993. Patented July 24, 1883.

Attest.
N. A. Clark
P. B. Turpin

Inventor,
Julius Goldstein
By R. S. & A. P. Lacey
Attys.

UNITED STATES PATENT OFFICE.

JULIUS GOLDSTEIN, OF WATERLOO, IOWA, ASSIGNOR TO SIEGFRIED GOLDSTEIN, OF SAME PLACE.

SALT-FEEDING DEVICE.

SPECIFICATION forming part of Letters Patent No. 281,993, dated July 24, 1883.

Application filed February 8, 1883. (No model.)

*To all whom it may concern:*

Be it known that I, JULIUS GOLDSTEIN, a citizen of the United States, residing at Waterloo, in the county of Black Hawk and State of Iowa, have invented certain new and useful Improvements in Devices for Feeding Salt; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improved salt-feeding devices; and it consists, essentially, in a solidified salt body supported on suitable bearings, whereby it is adapted to be revolved in substantially the manner hereinafter described.

Figure 1:
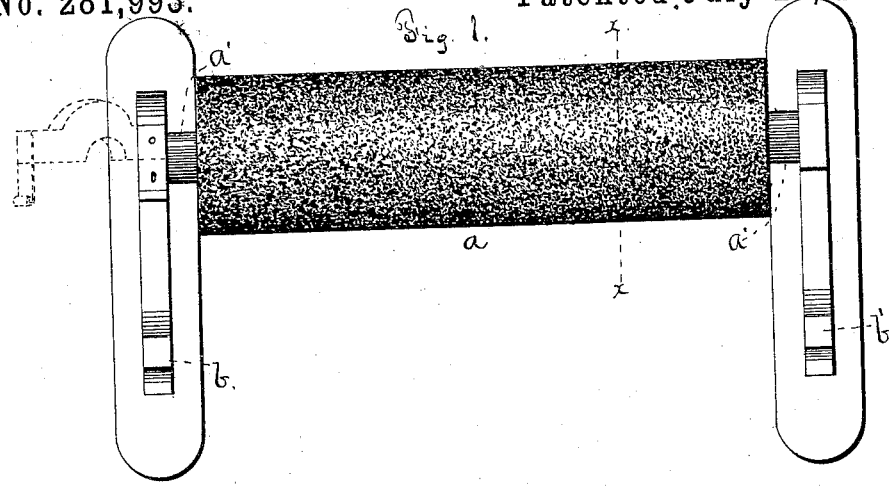
Figures 2, 3:
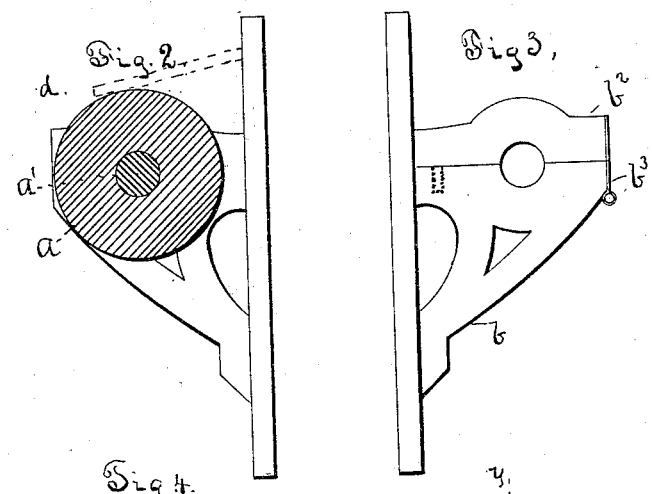
Figure 4:
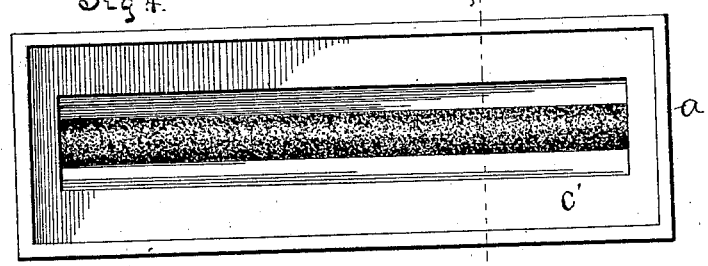
Figure 5:
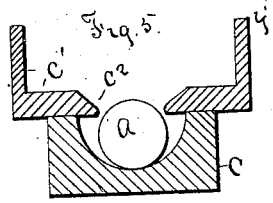

In the drawings, Figure 1 shows a front view of my salt roller suitably supported for use. Fig. 2 is a cross-sectional view on line $x$ $x$, Fig. 1. Fig. 3 shows one of the brackets. Fig. 4 is a top view, and Fig. 5 is a cross-sectional view on line $y$ $y$, Fig. 4. The Figs. 4 and 5 illustrate a means for supporting the salt roller different from that shown in Figs. 1, 2, and 3, as will be described.

In carrying out my invention, I preferably bring the salt to a cylindrical form upon a shaft or other central base, $a'$. This may be done by crystallizing, or otherwise depositing the salt on the base, as shown; or the salt might be solidified into a cylindrical shape without a central shaft, and then, when so desired, gudgeons could be secured to its opposite ends, whereby it might be journaled, so it could be revolved. I prefer, however, to solidify the salt on a central shaft, as thereby the body of salt is strengthened, and is not so likely to be broken. The ends of the shaft $a'$ extend beyond the ends of the body of salt, and are preferably journaled in brackets $b$ $b'$, which are secured in a stable or barn in reach of the cattle; or these brackets could be supported in the barnyard or field and protected by placing a board above them to keep off the rain. The bracket $b$ has the bar $b^2$ pivoted thereon, and the said bar can be turned to one side, as indicated in dotted lines, Fig. 1, when it is desired to remove the roller, and it is provided with the latch $b^3$, whereby it may be locked in position.

It will be understood that instead of supporting the salt roller, as described, the salt might be solidified into a cylindrical form with no central shaft and be suitably supported, for instance, in a trough, $c$, having the top piece, $c'$, provided with opening $c^2$, made large enough to permit the cattle to reach the salt roller with their tongues, as is shown in Figs. 4 and 5. When so used the salt-cylinder needs no central shaft, though for the purpose of bracing and strengthening the cylinder it may sometimes be used. I prefer, however, the construction shown in Figs. 1 and 2, before described. The opening $c^2$ in the board $c'$ is made large enough to permit the animals to reach the cylinder $a$ with their tongues, and yet small enough to prevent their biting lumps off or knocking the cylinder out of the trough.

In dotted lines $d$, Fig. 2, I have shown a board extended out over the roller to prevent the animals from biting off pieces of salt, and yet permit the animals to lick it, and thereby cause it to revolve and be equally worn over its entire periphery.

While my invention is of great convenience for feeding salt, it will also serve as a means for the prevention and cure of many diseases which are now so common among horses, cattle, sheep, and swine. This may be accomplished by mixing with the salt medical ingredients, remedial for particular diseases which it is desired to cure in any particular case, or ingredients which are known to be of general benefit to the class of animals to which it is to be fed, or might be of a preventive nature with reference to the diseases common among animals to which the salt is to be fed. By arranging the salt as described the animals always have ready access to it, and a great amount of salt is saved from waste as the roller revolves as the animal licks it, and the salt cannot be broken off in lumps. I prefer to crystallize or press the salt on the central shaft, and in so doing mix with it the medicinal ingredients which might, among others, be sulphur, iron, soda, blood-root, valerian, and ginger.

I do not desire to limit myself to any particular method of bringing the salt to the desired solid form, inasmuch as there are numerous ways in which such results could be obtained.

In preparing the salt it is sometimes advantageous to mix therewith some suitable glutinous substance, whereby the particles of salt are more readily brought to the desired compact form and the body of salt is strengthened.

I am aware that salt has been compressed into square, oval, and round or globular lumps for convenience in feeding same; also, that medicants have been combined therewith; and I do not broadly claim such as my invention.

Having thus described my invention, what I claim, and desire to secure by Letters Patent, is—

A salt-feeding device consisting of a solidified salt body supported on suitable bearings, whereby it is adapted to be revolved in the manner substantially as and for the purposes set forth.

In testimony whereof I affix my signature in presence of two witnesses.

JULIUS GOLDSTEIN.

Witnesses:
 CHAS. D. HENRY,
 A. H. CRANK.